Patented Feb. 12, 1946

2,394,793

UNITED STATES PATENT OFFICE 2,394,793

PREPARATION OF ORES FOR ALKALINE ROAST

Charles G. Maier, Los Altos, Calif., assignor to Pacific Bridge Company, a corporation of Delaware No Drawing. Application August 7, 1944,
Serial No. 548,512

18 Claims. (Cl. 75—3)

This invention provides a new technique for the treatment of ores containing acidic oxides that are to be extracted by first roasting with alkali or alkaline earth bases. It has been found that proper and suitable preparation of the furnace charge containing such ores in accordance with the methods disclosed below not only eliminates or minimizes many of the difficulties previously attendant on such procedures, but also permits the roasting itself to be conducted in furnaces of standard mechanical types not hitherto feasible for this method.

The essence of my invention is the discovery that if instead of the conventional alkaline earth carbonate or oxide used in the basic roast, I prepare the charge with hydrated lime, or any hydroxide of an alkaline earth, in the presence of an alkali metal carbonate, and if the charge then be subjected to a spherulizing, or agglomeration process, a series of chemical reactions occurs during this step, and prior to the roast, that are exceptionally valuable not only in solving the mechanical difficulties cited, but also promote the roast itself.

Another way of stating the basis of my invention is that by the use of combinations of an alkaline earth hydroxide and an alkali metal carbonate I have solved not only the problem of a suitable binding material for aggregates that avoids the use of objectionable reducing materials, and that maintains a considerable portion of its mechanical strength up to and into the roasting range of temperatures, but also by this combination have found it feasible to accelerate the chemical reactions of roasting to a remarkable degree.

The product of the spherulizing or agglomeration of a charge containing an acidic oxide ore, an alkaline earth hydroxide, and an alkali carbonate, consists of an aggregation of controllable unit size spherules, that may at will be from ½ inch to 2 inches or more average diameter. This aggregate is of great value as a furnace charge for the following reasons:

(1) The units of the aggregate, on proper treatment prior to furnacing, achieve a rock-like hardness, which is retained to a considerable extent when heated to reaction temperature (800° C.). Thus, mechanical feed to, and especially in the furnace, is facilitated, and dusting in the roasting furnace is virtually completely eliminated.

(2) The porosity of the charge is increased enormously. While the void space between the spherules is an obvious gain in this respect, it would be of no avail were the spherules themselves of enhanced density. It has been found, however, that the reactions both during spherulizing, and in the roast itself, especially during the preheating stage, afford an unusually high internal porosity with a minimum loss of strength, doubtless brought to pass by the chemical and crystalline nature of the bond. Thus, air penetration necessary for a successful roasting condition can be maintained with virtually any desired depth of bed in a furnace, in contrast to previous limitations of a few inches (4–6) in conventional practice.

(3) The nature of the chemical reactions during spherulizing lower the temperature of initiation of the roast by as much as 200 to 300° C., and the prepared charge may be calcined with higher extractions at about 200° lower temperature, in a roasting period from half to a third that required for a bedded charge.

(4) The absorptive power of the spherules is greatly enhanced in comparison with bedded charge, and thus if the roasting temperature occasionally exceeds the melting point of some constituent of the charge, a factor of safety is provided against drainage of liquid salts into the refractories of the furnace lining. This effect is partly ascribable to the spherule form, involving only substantially point contact with neighboring units of aggregate, as with the retaining refractory, but also because of an increased internal porosity and specific absorptive power of the spherule structure.

Before proceeding to a more explicit discussion of the chemistry of the process, I shall illustrate the exact measures undertaken to conduct it by specific reference to the treatment of a beach sand concentrate, from which substantially all of the silica has been removed by mechanical ore dressing methods, but containing values in chromium, titanium, and zirconium. The specific minerals present in this concentrate comprise chromite, chromiferous and titaniferous magnetite, ilmenite, zircon, and small quantities of unidentified spinels and garnets. Such material is not amenable to clean separation by mechanical means because of the spread of chromium and titanium through several of the mineralogical species included.

As first step, the ore is ground to a fineness at least permitting passage through a screen of 200 meshes per inch, preferably in the dry state. If wet ground, the ore must be dewatered and dried before use, otherwise the material will not agglomerate successfully. This fine grinding has been previously recognized as necessary for good extraction during alkaline roast, but has also been found essential in the present method to secure full benefit of the chemical action taking place during spherulizing, as will be explained in detail later.

The finely ground ore is then introduced into a tumbling barrel, or rotating open end cylinder, together with an amount of hydrated lime (calcium hydroxide) substantially equal to half the weight of ore taken, together with an amount of soda ash or other alkaline carbonate in anhydrous form equivalent to that stoichiometrically necessary to combine as normal alkali salt with the total content of all acidic oxides present in the ore as determined by prior chemical analysis.

The tumbling barrel is rotated at a speed slightly below the critical rate that would be imposed for action as a ball mill, so that cascading does just not take place, but the maximum rolling action ensues. When the ingredients have been thoroughly mixed by the rotation of the mill, a carefully measured quantity of water is admitted to the top sliding surface of the contents in the form of large droplets, by means of a perforated distributor tube within the cylinder. The position of the distributor is suitably parallel to the axis of rotation of the barrel, but displaced laterally so that the droplets fall upon the natural angle of repose of the charge at a point at least two thirds of the way up the slope.

The control of the quantity and rate of admission of water are of great importance. Thus in a typical charge of 600 pounds of the above mentioned concentrates, 320 pounds of hydrated lime, and 280 pounds of soda ash, the minimum permissible water will be 25 gallons, and the maximum 36 gallons. The exact amount most suitable depends on the particle size distribution of the ore and hydrated lime, or perhaps more precisely, on the specific absorptive surface of the substances as used, and its best determined by prior test on reduced scale. When using ordinary commercial grade of hydrated lime, I have found 30 gallons of water per 1200 pounds charge to be an excellent average that covers minor variations of the source materials. These 30 gallons should be admitted to the barrel during a period of time not less than 8 minutes, nor more than 20, a rate of 2 gallons per minute being suitable for the production of spherules of an average size of ¾ to 1 inch diameter.

At the expiration of this period, and under the conditions specified, the charge has been converted to slightly moist spherules. The appearance should be matte but not powdery. If insufficient water is used, the powdery spherules will have inadequate strength; if too much, they will be wet and sticky, or may even degenerate to a mud in extreme instances. Under normal conditions as above, the aggregate will have sufficient strength at this stage to permit discharge from the barrel, and transportation to a drying and "setting" unit, comprising the final step in the production of finished aggregate.

The drying and setting may be accomplished by simple storage with free access of air, but I prefer to conduct this step more expeditiously by passing the aggregate on trays, or on a moving steel belt conveyor, through a continuous drier operating at temperatures up to 300° C. with free access of air, or better yet flue gases containing available heat and carbon dioxide. The rate of heating during initial stages of drying must be moderate, in order that water vapor may escape from the spherules of diffusion, otherwise blistering or disintegration may be encountered. This difficulty is usually not present if the drying is done in a continuous countercurrent unit with 300° maximum temperature. This latter temperature is sufficient to rapidly drive off substantially all of the "free" water in the spherules, leaving only hydroxyl and chemically bound water. The residual bound water is an essential ingredient. At this point, the aggregate has attained a maximum "set" or hardness, and may be fed directly to the roasting furnace, or stored for subsequent use. Storage is not deleterious, except for a slight hygroscopic quality of the aggregate, which may render redrying necessary after long exposure to a very moist climate.

Having described in detail a typical procedure for the use of this method of ore preparation, I shall now discuss pertinent chemical features of the method.

During the preparation of the spherules, an appreciable amount of sensible heat is liberated that does not appear ascribable to the heat of solution of the alkali carbonates, since under proper operation no free solution is formed. This heat is probably the heat of the reaction $$Ca(OH)_2 + Na_2CO_3 \rightleftarrows 2NaOH:CaCO_3$$

The conditions pertaining to spherule formation are not, and should not be such as to lead to a conventional causticizing process. The fact that spherules do not soften or melt near 300° C., which is close to the melting point of caustic soda, indicates that no considerable quantity of free caustic alkali is formed. If it were, the product would be unusable due to fusion in the roasting unit. Thus, while there is undoubtedly an initial tendency for a causticizing reaction to begin, the evidence seems to indicate that under the concentration conditions existing, there is formed a solid, possibly crystalline, hydroxycarbonate of alkaline earth and alkali similar to a double or mixed salt, or else there is attained under these circumstances such a powerful surface adsorption of hydroxide on carbonate that the product cannot be considered to contain free alkali hydroxide. The term "hydroxycarbonates of an alkali and an alkaline earth" is used herein and in the claims as describing and defining this. What is important is that a hard, infusible spherule is produced, which I have found constitutes a sort of solid "buffer" or reservoir capable of furnishing free alkali at temperatures above 300° C., but limited by the "acceptance" of the alkali by the acidic oxides formed on roasting.

I attribute the superior results obtained in the roasting process when using spherules made as described to the fact that I have by this means made caustic alkali available, without having it present in more than minor concentrations. As has been pointed out, free alkali itself could not be used practically because of fusion occurring about 300° C. with this substance.

I have observed, however, that when using ore ground less finely than specified, as for example unground sand concentrates, less strength of bond is obtained in the spherules. This seems to prove that there is some etching, or other surface chemical action on the individual ore particle during the spherulizing step. This action may also be responsible in part for further improvement in roasting results.

During the drying and setting stage of the process, especially where this is accomplished in flue gases containing $CO_2$, there is some absorption of $CO_2$ in the surface of the spherules. This is not a disadvantage, since the penetration is rarely more than about 1 mm. depth, and results only in a definitely harder shell, somewhat like an egg shell, about the spherules. The depth of penetration can be seen readily upon breaking a spherule. This shell serves to still further armor the aggregate until it has been subject to roasting conversion.

In the roasting furnace, water and $CO_2$ are slowly lost, increasing the porosity of the spherule, and especially the shell. Because of the enhanced availability of alkali, as soon as this occurs, salts are formed with the acidic oxides of the ore, whence no unusual loss of strength results. Since the process at this stage is one of recrystallization, the permeability of the spherules to oxygen is not lost.

It might be thought that calcium oxide, or other alkaline earth oxides, might be used instead of the hydroxides, since water itself is admixed during the spherulizing step. I have found that the use of the oxide does not result in the formation of strong, stable spherules. While this may be due in part to the swelling always encountered when alkaline earth oxides are slaked, I regard the failure of such a mix to set properly as further evidence and proof that a special kind of hydroxy-carbonate, or mixed or double salt is formed in this process.

From the foregoing discussion of the chemical features of this method, it will be clear that I am not limited to specific proportions of alkaline earth hydrate and alkali carbonate, or vice versa. Thus, should it be desirable from the standpoint of subsequent treatment to use less alkaline earth, I may reduce this quantity and still retain a setting quality. Spherules can be made without alkaline earth hydroxide, but I have found that the setting in this instance is due entirely to a hydration of the alkali carbonate. While the crystals of hydrate thus formed are a satisfactory bond while cold, the hydrate tends to melt in its own water of crystallization on heating, causing the spherules to become soft and sticky. I have used as little as 10% of the weight of ore taken as alkaline earth hydroxide, and have obtained usable, hard spherules, but the extraction or conversion on roasting by conventional methods is lessened thereby, and ending in reduced furnace capacity.

It is to be noted that the proper amount of water used for spherulizing, or for bringing about suitable formations of hydroxy-carbonates, must be decreased when lesser amounts of alkaline earth hydroxide are added to the mix. Thus, with 600 pounds of ore as above, 280 pounds of soda ash, and 60 pounds of hydrated lime, I have found 20 gallons of water to be the upper limit, and about 14 gallons the lower, with about 16 gallons per 940 pounds charge as suitable average. The exact proportions to be used are again best determined empirically for each type or grind of ore, and each composition of mix.

Further, it will be apparent that the substances formed during spherule production, which I have termed hydroxy-carbonates, may also be used as bonding agents for briquettes, if desired. My method provides a general type of bonding agent, where further any alkali carbonate, or any alkaline earth hydroxide may be substituted, if desired. In this connection, I have found that the difficulty previously encountered when using oxide or carbonate alkaline earths as "drying" agent for the roast, resulting in the formation of considerable quantities of salts of acidic oxides with the alkaline earths, as for example calcium or magnesium chromates, are virtually completely eliminated by the use of my method. These salts are undesirable because of their difficult solubility on leaching the calcine, even when alkali carbonates are present in excess. I attribute the virtually complete absence of difficultly soluble salts in calcine made from aggregate to the enhanced availability of the alkali in it, as explained above, and to the fact that this increased availability also permits calcination at temperatures at least 200 lower.

It is also apparent that since the reactions involved in the setting of spherules are of a reversible nature, it is possible, even though not ordinarily of economic advantage, to start with alkaline earth carbonates and substantially anhydrous alkali hydroxides. In its broadest aspect, the present invention can be practiced by utilizing an alkaline earth carbonate instead of an alkaline earth hydroxide and an alkali metal hydroxide instead of an alkali metal carbonate, and broadly speaking, these materials are to be considered as equivalents and within my invention. However, the use of an alkaline earth hydroxide and an alkali metal carbonate is preferred for when an alkaline earth carbonate and an alkali metal hydroxide are employed I have found that the crystallization rate is much slower, resulting in less effective bonding, and in the danger that if improperly aged and set, the spherules may fuse partially during roasting.

My method may also be practiced by using the alkali carbonate in solution form, whereas the ore and alkaline earth hydroxide are kept anhydrous. This modification has been found to accelerate the "set" of spherules or other form of aggregate, but ordinarily at some sacrifice of ultimate strength. This factor is attributable to an enhanced rate of crystallization producing smaller, and less interlocking crystals, hence inferior hardness. This version may be employed effectively, however, when the normal time period specified above for spherule formation is too great to fit into a continuous cycle of plant operations whose rate must be adjusted by considerations other than ore preparation.

This inveniton refers specifically to the initial preparation of ores for alkaline roast, and may be used for the spherulizing, agglomeration, or briquetting of any fine ground ore that is to be calcined in an alkaline environment. While the aggregate produced by this method may be treated subsequently by any conventional roasting method, I have disclosed, in a copending application, Serial No. 548,511, filed August 7, 1944, further improvements in the calcination proper that may be attained by starting with ore so prepared.

While the special teaching with reference to roasting is reserved for this co-pending application, it is plain that some, but not all, of the advantages, especially those of chemical environment, are independent of the physical form of the product. Thus, in certain instances it might prove desirable to utilize these advantages by admixture of the constituent substances used without special reference to state of aggregation. The preparation of an ore by this method is not, therefore, limited to the act of producing an aggregate, but is intended in the broader sense of bringing together certain substances in such a manner that exceptional technical advantages are securable.

On the converse, the physical properties of the hydroxy-carbonates as bonds for retention of aggregate form at elevated temperatures, combined with high perviousness to gas diffusion secured in the aggregates so formed may also prove of considerable use for ores not containing acidic oxides in the usual sense, that are to be treated by gas reduction methods. The presence of acidic oxides is not an essential factor of this method; it would be eminently suited, for example, for the production of an aggregate of fine magnetic, or other iron ores, not containing sufficient content of acidic oxides to constitute a workable ore of these latter substances, but of value for iron content only. As a method of preparation of ores, this invention is obviously not limited by the subsequent treatment to be accorded such ores, except, of course, the requirement that an alkaline environment is automatically provided.

I claim:

1. In the preparation of ores for alkaline roast, the bonding of finely divided ore particles into discrete aggregates of a desired size and shape with solid, infusible hydroxy-carbonates of an alkaline earth and an alkali metal.

2. In the preparation of ores containing acidic oxides for alkaline roast, the step of forming an ore charge including a solid, infusible hydroxy-carbonate of an alkaline earth and an alkali metal.

3. The step in the preparation of an ore for subsequent treatment in an alkaline environment that includes the intimate mixture of a comminuted ore with an amount of anhydrous alkali carbonate suited to subsequent treatment of the ore and with an amount of an alkaline earth hydroxide greater than about 10% of the weight of ore to be treated.

4. The step in the preparation of an ore for subsequent treatment in an alkaline environment which consists in the uniform dispersion of controlled quantities of water through a mixture of said ore with suitable quantities of alkaline earth hydroxide and alkali carbonate to form a solid crystalline hydroxy-carbonate of an alkaline earth and an alkali metal in the ore.

5. The step in the preparation of an ore for subsequent treatment which consists in the uniform dispersion of controlled quantities of a solution of an alkali carbonate through a mixture of said ore with an excess of 10% by weight of an alkaline earth hydroxide.

6. The step in the preparation of an ore for subsequent treatment in an alkaline environment which consists in removal of free water at temperatures under 300° C. from a wet mixture of said ore with an alkaline earth hydroxide and an alkali carbonate to form a solid, infusible hydroxy-carbonate of an alkali metal and an alkaline earth.

7. The aggregation of a finely divided ore by controlled wetting of a mixture of said ore and an alkaline earth hydroxide and an alkali carbonate in substantially anhydrous form.

8. The preparation of an ore for subsequent treatment in an alkaline environment which comprises wetting a mixture of said ore and an alkaline earth carbonate and an alkali hydroxide in substantially anhydrous form to form agglomerates of a desired size and shape, and drying the mixture.

9. In the preparation of an ore, the step of intimately associating ore particles with a solid, infusible, crystalline hydroxy-carbonate of an alkali metal and an alkaline earth.

10. A process for preparation for alkaline roasting of an acidic oxide containing ore comprising mixing dry, finely divided ore with an alkaline earth hydroxide and an alkali metal carbonate, the quantity of said hydroxide being at least 10% on the weight of the ore, the quantity of said alkali metal carbonate being substantially equivalent to that required stoichiometrically to combine as normal alkali salt with the total content of all acidic oxides present in the ore, adding sufficient water to the mixture to enable it to be formed into discrete agglomerates, forming the wet mixture into discrete agglomerates, and drying the coarse agglomerates.

11. A process for preparation for alkaline roasting of an acidic oxide containing ore comprising mixing dry, finely divided ore with an alkaline earth hydroxide and an alkali metal carbonate, the quantity of said hydroxide being about 50% on the weight of the ore, the quantity of said alkali metal carbonate being substantially equivalent to that required stoichiometrically to combine as normal alkali salt with the total content of all acidic oxides present in the ore, adding sufficient water to enable it to be formed into discrete agglomerates, forming the wet mixture into discrete agglomerates, and drying the coarse agglomerates.

12. A process for preparation for alkaline roating of an acidic oxide containing ore comprising mixing dry, finely divided ore with an alkaline earth hydroxide and an alkali metal carbonate, the quantity of said hydroxide being at least 10% on the weight of the ore, the quantity of said akali metal carbonate being substantially equivalent to that required stoichiometrically to combine as normal alkali salt with the total content of all acidic oxides present in the ore, adding sufficient water to the mixture to enable it to be formed into discrete agglomerates, forming the wet mixture into discrete agglomerates, and drying the coarse agglomerates at a temperature below about 300° C.

13. A process for preparation for alkaline roasting of an acidic oxide containing ore comprising mixing dry, finely divided ore with an alkaline earth hydroxide and an alkali metal carbonate, the quantity of said hydroxide being at least 10% on the weight of the ore, the quantity of said alkali metal carbonate being substantially equivalent to that required stoichiometrically to combine as normal alkali salt with the total content of all acidic oxides present in the ore, adding sufficient water to the mixture to enable it to be formed into discrete agglomerates, forming the wet mixture into discrete agglomerates, and drying the coarse agglomerates at a temperature below a maximum upper temperature of about 300° C.

14. A process for preparation of agglomerates of an ore comprising mixing the ore in finely divided form with sufficient of an alkali metal carbonate, an alkaline earth hydroxide and sufficient water to enable the wet mixture to be formed into discrete agglomerates of a desired size and shape, forming the mixture into discrete agglomerates of the mixture, and drying the agglomerates.

15. A discrete agglomerate containing particles of a finely divided acidic oxide ore bonded together with an alkaline earth hydroxide and an alkali metal carbonate.

16. A discrete agglomerate containing particles of a finely divided acidic oxide ore bonded together with an hydroxycarbonate of an alkaline earth and an alkali metal.

17. A discrete agglomerate containing particles of a finely divided ore bonded together with an alkaline earth hydroxide and an alkali metal carbonate.

18. A discrete agglomerate containing particles of a finely divided ore bonded together with an hydroxy-carbonate of an alkaline earth and an alkali metal.

CHARLES G. MAIER.